United States Patent
Colak et al.

(10) Patent No.: US 9,718,920 B2
(45) Date of Patent: Aug. 1, 2017

(54) REACTIVE POLYOXAZOLINES HAVING A PERFLUORINATED GROUP

(71) Applicant: 3M INNOVATIVE PROPERTIES COMPANY, St. Paul, MN (US)

(72) Inventors: Semra Colak, Saint Louis Park, MN (US); Paul B. Armstrong, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 21 days.

(21) Appl. No.: 14/648,733

(22) PCT Filed: Dec. 10, 2013

(86) PCT No.: PCT/US2013/074016
§ 371 (c)(1),
(2) Date: Jun. 1, 2015

(87) PCT Pub. No.: WO2014/099465
PCT Pub. Date: Jun. 26, 2014

(65) Prior Publication Data
US 2015/0329673 A1  Nov. 19, 2015

Related U.S. Application Data

(60) Provisional application No. 61/739,150, filed on Dec. 19, 2012.

(51) Int. Cl.
*C08G 69/48* (2006.01)
*C09D 179/02* (2006.01)
*C08G 73/02* (2006.01)

(52) U.S. Cl.
CPC ......... *C08G 69/48* (2013.01); *C08G 73/0233* (2013.01); *C09D 179/02* (2013.01)

(58) Field of Classification Search
CPC ... C08G 69/48; C08G 73/024; C08G 73/0233
USPC ....................................................... 525/535
See application file for complete search history.

(56) References Cited

U.S. PATENT DOCUMENTS

| | | | | |
|---|---|---|---|---|
| 3,198,754 | A * | 8/1965 | Ahlbrecht | C07D 203/18 442/82 |
| 3,483,141 | A * | 12/1969 | Levy | C08G 73/00 528/402 |
| 3,575,890 | A * | 4/1971 | Litt et al. | C08G 73/0233 528/402 |
| 3,640,909 | A * | 2/1972 | Jones et al. | C09G 73/0233 162/164.3 |
| 4,011,376 | A * | 3/1977 | Tomalia | C08G 73/0233 528/392 |
| 4,958,005 | A | 9/1990 | Saegusa et al. | |
| 5,219,662 | A | 6/1993 | Grimminger | |
| 5,472,838 | A * | 12/1995 | Helling | G03C 7/396 430/569 |
| 7,585,919 | B2 | 9/2009 | Pocius | |
| 8,816,004 | B2 | 8/2014 | Clapper et al. | |
| 2005/0106208 | A1 | 5/2005 | Neff | |
| 2007/0254979 | A1 | 11/2007 | Salz | |
| 2008/0185332 | A1 | 8/2008 | Niu | |
| 2009/0004241 | A1 | 1/2009 | Ho | |

FOREIGN PATENT DOCUMENTS

| | | |
|---|---|---|
| EP | 0136025 | 4/1985 |
| EP | 0244828 | 11/1987 |
| EP | 0616256 | 9/1994 |
| EP | 1219661 | 7/2002 |
| EP | 1897626 | 3/2008 |
| FR | 2941971 | 8/2013 |
| JP | 03056535 A * | 3/1991 |
| KR | 2009-0126796 | 12/2009 |
| WO | WO 00-34361 | 6/2000 |
| WO | WO 00-37541 | 6/2000 |
| WO | WO 2010-089484 | 8/2010 |
| WO | WO 2013-000478 | 1/2013 |
| WO | WO 2013-123507 | 8/2013 |
| WO | WO 2014-099518 | 6/2014 |

OTHER PUBLICATIONS

Banerjee, "Antifouling Coatings: Recent Developments in the Design of Surfaces That Prevent Fouling by Proteins, Bacteria, and Marine Organisms", Advanced .Materials, 2011, vol. 23, pp. 690-718.
Buckingham-Meyer, "Comparative evaluation of biofilm disinfectant efficacy tests", Journal of Microbiological Methods, 2007, vol. 70, pp. 236-244.
Chatelier, "Quantitative Analysis of Polymer Surface Restructuring", Langmuir, 1995, vol. 11, No. 7, pp. 2576-2584.
Chen, "A New Avenue to Nonfouling Materials", Adv. Mater., 2008, vol. 20, pp. 335-338.
Cheng, "Inhibition of bacterial adhesion and biofilm formation on zwitterionic surfaces", Biomaterials, 2007, vol. 28, pp. 4192-4199.
Darouiche, "Treatment of Infections Associated with Surgical Implants", N. Engl J. Med., Apr. 2004, vol. 350, No. 14, pp. 1422-1429.
Hall-Stoodley, "Bacterial biofilms: From the natural environment to infectious diseases", Nature Reviews, Microbiology, 2004, vol. 2, pp. 95-108.

(Continued)

*Primary Examiner* — Mike M Dollinger
(74) *Attorney, Agent, or Firm* — Julie Lapos-Kuchar

(57) ABSTRACT

A compound of the formula: (I) wherein: $R^1$ is selected from H, an alkyl group, an aryl group, and combinations thereof; $R^2$ is $R^f$—Y—$(CH_2)X$—; $R^3$ is a reactive group; $R^f$ is a perfluorinated alkyl group; Y is selected from a bond, $S(O)_2$—$N(CH_3)$—, —$S(O)_2$—$N(CH_2CH_3)$—, —$S(O)_2$—O— —$S(O)_2$— —C(O)—, —C(O)—S— —C(O)—O— —C(O)—NH—, —C(O)—$N(CH_3)$—, —C(O)—N$(CH_2CH_3)$—, —$(CH_2CH_2)$y-, —O—, and —O—C(O)—CH=CH—C(O)—O—; n is greater than 10; x is 2 to 20; and y is at least 1.

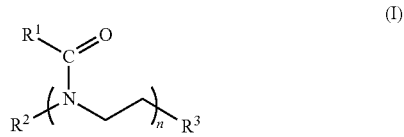

(I)

14 Claims, No Drawings

(56) References Cited

OTHER PUBLICATIONS

Holmlin, "Zwitterionic SAMs that Resist Nonspecific Adsorption of Protein from Aqueous Buffer", Langmuir, 2001, vol. 17, No. 9, pp. 2841-2850.
Hoogenboom, "Poly (2-oxazoline): A Polymer Class with Numerous Potential Applications", Agnew. Chem. Int. Ed., 2009, vol. 48, pp. 7978-7994.
Hucknall, "In Pursuit of Zero: Polymer Brushes that Resist the Adsorption of Proteins", Adv. Mater., 2009, vol. 21, pp. 2441-2446.
Ivanova, "Micellar Structures of Hydrophilic/Lipophilic and Hydrophilic/Fluorophilic Poly(2-oxazoline) Diblock Copolymers in Water", Macromol. Chem. Phys., 2008, vol. 209, pp. 2248-2258.
Jiang et al., "Ultralow-Fouling, Functionalizable, and Hydrolyzable Zwitterionic Materials and Their Derivatives for Biological Applications", Adv. Mater., 2010, vol. 22; pp. 920-932.
Kaku, "New Fluorinated Oxazoline Block Copolymer Lowers the Adhesion of Platelets on Polyurethane Surfaces," Journal of Polymer Science: Part A: Polymer Chemistry, 1994, vol. 32, pp. 2187-2192.
Kane, "Kosmotropes Form the Basis of Protein-Resistant Surfaces", Langmuir, 2003, vol. 19, No. 6, pp. 2388-2391.
Knetsch, "New Strategies in the Development of Antimicrobial Coatings: The Example of Increasing Usage of Silver and Silver Nanoparticles", Polymers, 2011, vol. 3, pp. 340-366.
Kobayashi, "Synthesis of a Nonionic Polymer Surfactant from Cyclic Imino Ethers by the Initiator Method", Macromolecules, 1987, vol. 20, No. 8, pp. 1729-1734.
Kobayashi, "Synthesis of Acryl- and Methacryl-Type Macromonomers and Telechelics by Utilizing Living Polymerization of 2-Oxazolines," Macromolecules, 1989, vol. 22, No. 7, pp. 2878-2884.
Konradi, "Poly-2-methyl-2-oxazoline: A Peptide-like Polymer for Protein-Repellant Surfaces," Langmuir, 2008, vol. 24, pp. 613-616.
Krishnan, "Advances in polymers for anti-biofouling surfaces", J. Mater. Chem., 2008, vol. 18, pp. 3405-3413.
Ma, "Surface-Initiated Atom Transfer Radical Polymerization of Oligo (ethylene glycol) Methyl Methacrylate from a Mixed Self-Assembled Monolayer on Gold", Adv. Funct. Mater., 2006, vol. 16, pp. 640-648.
Madkour, "Fast Disinfecting Antimicrobial Surfaces", Langmuir, 2009, vol. 25, No. 2, pp. 1060-1067.
Miyamoto, "Novel Covalent-Type Electrophilic Polymerization of 2- (Perfluoroalkyl)-2-oxazolines Initiated by Sulfonates," Macromolecules, 1991, vol. 24, No. 1, pp. 11-16.
Miyamoto, "Preperation of Poly [(N-acetylimino) ethylene] Having (Perfluoroacylimino) ethyl End Group and Its Surface Activity," Polymer Journal, 1995, vol. 27, No. 5, pp. 461-468.
Mrksich, "A Surface Chemistry approach to studying cell adhesion", Chem. Soc. Rev., 2000, vol. 29, pp. 267-273.
Ostuni, "A Survey of Structure—Property Relationships of Surfaces that Resist the adsorption of Protein", Langmuir, 2001, vol. 17, No. 18, pp. 5605-5620.
Prime, "Adsorption of Proteins onto Surfaces Containing End-Attached Oligo (ethylene oxide): A Model System Using Self-Assembled Monolayers", J. Am. Chem. Soc., 1993, vol. 115, No. 23, pp. 10714-10721.
Ramsden, "Puzzles and Paradoxes in Protein Adsorption", J. Chem Soc. Rev., 1995, vol. 24, pp. 73-78.
Shen, "PEO-like plasma polymerized tetraglyme surface interactions with leukocytes and proteins: in vitro and in vivo studies", J. Biomater. Sci. Polymer. Edn., 2002, vol. 13, No. 4, pp. 367-390.
Weberskirch, "Design and synthesis of a two compartment micellar system based on the self-association behavior of poly (N-acylethyleneimine) end-capped with a fluorocarbon and a hydrocarbon chain", Macromol. Chem. Phys., 2000, vol. 201, No. 10, pp. 995-1007, XPO551O9078.
Werner, "Current Strategies towards hemocompatible coatings", J. Mater. Chem., 2007, vol. 17, pp. 3376-3384.
Yang, "Pursuing "Zero" Protein Adsorption of Poly (Carboxybetain) from Undiluted Blood Serum and Plasma", Langmuir, 2009, vol. 25, No. 19, pp. 11911-11916.
Biofouling Prevention Coatings—Office of Naval Research, http://www.onr.navy.mil/Media-Center/Fact-Sheets/Biofouling-Prevention.aspx, 2 pages.
International Search report for PCT International Application No. PCT/US2013/074016 mailed on Apr. 14, 2014, 4 pages.

* cited by examiner

REACTIVE POLYOXAZOLINES HAVING A PERFLUORINATED GROUP

CROSS REFERENCE TO RELATED APPLICATIONS

This application is a national stage filing under 35 U.S.C. 371 of PCT/US2013/074016, filed Dec. 10, 2013, which claims priority to U.S. Provisional Application No. 61/739,150, filed Dec. 19, 2012, the disclosure of which is incorporated by reference in their entirety herein.

BACKGROUND

Surfaces that possess unique wetting behavior, such as superhydrophilicity (surfaces having water contact angles of less than 5°) or amphiphilicity (surfaces having affinity to both hydrophilic and hydrophobic media) are desirable for a number of applications. For instance, surfaces that resist fogging are needed for windshields, safety glasses, and other eyewear. Fog forms when water condenses on a material and beads up to form micron-sized droplets that scatter light, resulting in haziness. Superhydrophilic surfaces often resist fog formation because any condensing water instantly wets the surface to form a transparent thin film rather than individual droplets. However, the anti-fogging properties of these surfaces can be masked by environmental contamination. Thus, surfaces that exhibit easy removal of contamination from grease or dust can help retain anti-fog properties for prolonged exposure times.

The need for easy-to-clean (i.e., easy clean) and anti-fogging surfaces is therefore driving the development of new amphiphilic polymers with reactive groups that can be formulated into robust, durable coatings.

SUMMARY

The present disclosure provides reactive polyoxazolines (POx) having a perfluorinated alkyl group. More specifically, the disclosure provides novel amphiphilic polymerizable polymers, where polyoxazolines are employed as the hydrophilic component, and a perfluorinated alkyl group is employed as the hydrophobic component. Such polymerizable polymers are suitable for use in making amphiphilic polymers that are useful in making anti-fog, anti-fouling, and/or easy clean coatings.

In one embodiment, the present disclosure provides a compound of the formula:

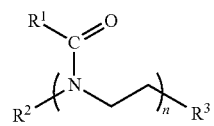

wherein: $R^1$ is selected from H, an alkyl group, an aryl group, and combinations thereof; $R^2$ is $R^f$—Y—$(CH_2)_x$—; $R^3$ is a reactive group; $R^f$ is a perfluorinated alkyl group; Y is selected from a bond, —S(O)$_2$—N(CH$_3$)—, —S(O)$_2$—N(CH$_2$CH$_3$)—, —S(O)$_2$—O—, —S(O)$_2$—, —C(O)—, —C(O)—S—, —C(O)—O—, —C(O)—NH—, —C(O)—N(CH$_3$)—, —C(O)—N(CH$_2$CH$_3$)—, —(CH$_2$CH$_2$O)$_y$—, —O—, and —O—C(O)—CH=CH—C(O)—O—; n is an integer of greater than 10; x is an integer from 2 to 20; and y is an integer of at least 1.

In one embodiment, the present disclosure provides a compound of the formula:

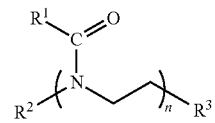

wherein: $R^1$ is selected from H, an alkyl group, an aryl group, and combinations thereof; $R^2$ is $R^f$—Y—$(CH_2)_x$—; $R^3$ is a reactive group selected from a polymerizable group and a group of formula —W—Si($R^9$)$_3$; $R^f$ is a perfluorinated alkyl group; Y is selected from a bond, —S(O)$_2$—N(CH$_3$)—, —S(O)$_2$—N(CH$_2$CH$_3$)—, —S(O)$_2$—O—, —S(O)$_2$—, —C(O)—, —C(O)—S—, —C(O)—O—, —C(O)—NH—, —C(O)—N(CH$_3$)—, —C(O)—N(CH$_2$CH$_3$)—, —(CH$_2$CH$_2$O)$_y$—, —O—, and —O—C(O)—CH=CH—C(O)—O—; n is an integer of greater than 10; x is an integer from 2 to 20; y is an integer of at least 1; W is an organic group; and each $R^9$ is independently an alkyl group, aryl group, a combination thereof, or a hydrolyzable group, wherein at least one $R^9$ is a hydrolyzable group.

In one embodiment, the present disclosure provides a compound of the formula:

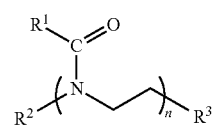

wherein: $R^1$ is selected from H, an alkyl group, an aryl group, and combinations thereof; $R^2$ is $R^f$—Y—$(CH_2)_x$—; $R^3$ is a reactive group selected from a vinyl group, a vinylether group, a (meth)acryloyloxy group, a (meth)acryloylamino group, a trialkoxysilylalkylthio group, and a trialkoxysilylalkylamino group; $R^f$ is a perfluorinated (C1-C5)alkyl group; Y is selected from a bond, —S(O)$_2$—N(CH$_3$)—, —C(O)—NH—, and —(CH$_2$CH$_2$O)$_y$—; n is an integer from 20 to 100; x is an integer from 2 to 20; and y is an integer from 1 to 20.

As used herein, the term "organic group" means a hydrocarbon group (with optional elements other than carbon and hydrogen, such as oxygen, nitrogen, sulfur, silicon, and halogens) that is classified as an aliphatic group, cyclic group, or combination of aliphatic and cyclic groups (e.g., alkaryl and aralkyl groups). In the context of the present invention, the organic groups are those that do not interfere with the formation of the reactive polyoxazoline. The term "aliphatic group" means a saturated or unsaturated linear or branched hydrocarbon group. This term is used to encompass alkyl, alkenyl, and alkynyl groups, for example. The term "alkyl group" is defined herein below. The term "alkenyl group" means an unsaturated, linear or branched hydrocarbon group with one or more carbon-carbon double bonds, such as a vinyl group. The term "alkynyl group" means an unsaturated, linear or branched hydrocarbon group with one or more carbon-carbon triple bonds. The term "cyclic group" means a closed ring hydrocarbon group that is classified as an alicyclic group, aromatic group, or heterocyclic group. The term "alicyclic group" means a cyclic hydrocarbon group having properties resembling those of aliphatic groups. The term "aromatic group" or "aryl group" are defined herein below. The term "heterocyclic group" means a closed ring hydrocarbon in which one or more of the atoms in the ring is an element other than carbon (e.g., nitrogen, oxygen, sulfur, etc.). The organic group can have any suitable valency but is often monovalent or divalent.

The term "alkyl" refers to a monovalent group that is a radical of an alkane and includes straight-chain, branched, cyclic, and bicyclic alkyl groups, and combinations thereof, including both unsubstituted and substituted alkyl groups. Unless otherwise indicated, the alkyl groups typically contain from 1 to 30 carbon atoms. In some embodiments, the alkyl groups contain 1 to 20 carbon atoms, 1 to 10 carbon atoms, 1 to 6 carbon atoms, 1 to 4 carbon atoms, or 1 to 3 carbon atoms. Examples of alkyl groups include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, norbornyl, and the like.

The term "alkylene" refers to a divalent group that is a radical of an alkane and includes groups that are linear, branched, cyclic, bicyclic, or a combination thereof. Unless otherwise indicated, the alkylene group typically has 1 to 30 carbon atoms. In some embodiments, the alkylene group has 1 to 20 carbon atoms, 1 to 10 carbon atoms, 1 to 6 carbon atoms, or 1 to 4 carbon atoms. Examples of alkylene groups include, but are not limited to, methylene, ethylene, 1,3-propylene, 1,2-propylene, 1,4-butylene, 1,4-cyclohexylene, and 1,4-cyclohexyldimethylene.

The term "alkoxy" refers to a monovalent group having an oxy group bonded directly to an alkyl group.

The term "aryl" refers to a monovalent group that is aromatic and, optionally, carbocyclic. The aryl has at least one aromatic ring. Any additional rings can be unsaturated, partially saturated, saturated, or aromatic. Optionally, the aromatic ring can have one or more additional carbocyclic rings that are fused to the aromatic ring. Unless otherwise indicated, the aryl groups typically contain from 6 to 30 carbon atoms. In some embodiments, the aryl groups contain 6 to 20, 6 to 18, 6 to 16, 6 to 12, or 6 to 10 carbon atoms. Examples of an aryl group include phenyl, naphthyl, biphenyl, phenanthryl, and anthracyl.

The term "arylene" refers to a divalent group that is aromatic and, optionally, carbocyclic. The arylene has at least one aromatic ring. Any additional rings can be unsaturated, partially saturated, or saturated. Optionally, an aromatic ring can have one or more additional carbocyclic rings that are fused to the aromatic ring. Unless otherwise indicated, arylene groups often have 6 to 20 carbon atoms, 6 to 18 carbon atoms, 6 to 16 carbon atoms, 6 to 12 carbon atoms, or 6 to 10 carbon atoms.

The term "aralkyl" refers to a monovalent group that is an alkyl group substituted with an aryl group (e.g., as in a benzyl group). The term "alkaryl" refers to a monovalent group that is an aryl substituted with an alkyl group (e.g., as in a tolyl group). Unless otherwise indicated, for both groups, the alkyl portion often has 1 to 10 carbon atoms, 1 to 6 carbon atoms, or 1 to 4 carbon atoms and an aryl portion often has 6 to 20 carbon atoms, 6 to 18 carbon atoms, 6 to 16 carbon atoms, 6 to 12 carbon atoms, or 6 to 10 carbon atoms.

The term "aralkylene" refers to a divalent group that is a an alkylene group substituted with an aryl group or an alkylene group attached to an arylene group. The term "alkarylene" refers to a divalent group that is an arylene group substituted with an alkyl group or an arylene group attached to an alkylene group. Unless otherwise indicated, for both groups, the alkyl or alkylene portion typically has from 1 to 20 carbon atoms, 1 to 10 carbon atoms, 1 to 6 carbon atoms, or 1 to 4 carbon atoms. Unless otherwise indicated, for both groups, the aryl or arylene portion typically has from 6 to 20 carbon atoms, 6 to 18 carbon atoms, 6 to 16 carbon atoms, 6 to 12 carbon atoms, or 6 to 10 carbon atoms.

The term "perfluorinated alkyl group" or "perfluoroalkyl group" refers to an alkane group having all C—H bonds replaced with C—F bonds.

The term "silyl" refers to a monovalent group of formula —Si($R^c$)$_3$ where $R^c$ is a hydrolyzable group or a non-hydrolyzable group. In many embodiments, the silyl group is a "hydrolyzable silyl" group, which means that the silyl group contains at least one $R^c$ group that is a hydrolyzable group.

The term "hydrolyzable group" refers to a group that can react with water having a pH of 1 to 10 under conditions of atmospheric pressure. The hydrolyzable group is often converted to a hydroxyl group when it reacts. The hydroxyl group often undergoes further reactions. Typical hydrolyzable groups include, but are not limited to, alkoxy, aryloxy, aralkyloxy, alkaryloxy, acyloxy, or halo. As used herein, the term is often used in reference to one of more groups bonded to a silicon atom in a silyl group.

The term "non-hydrolyzable group" refers to a group that cannot react with water having a pH of 1 to 10 under conditions of atmospheric pressure. Typical non-hydrolyzable groups include, but are not limited to, alkyl, aryl, aralkyl, and alkaryl. As used herein, the term is often used in reference to one or more groups bonded to a silicon atom in a silyl group.

The term "alkoxy" refers to a monovalent group having an oxy group bonded directly to an alkyl group.

The term "aryloxy" refers to a monovalent group having an oxy group bonded directly to an aryl group.

The terms "aralkyloxy" and "alkaryloxy" refer to a monovalent group having an oxy group bonded directly to an aralkyl group or an alkaryl group, respectively.

The term "acyloxy" refers to a monovalent group of the formula —O(CO)$R^b$ where $R^b$ is alkyl, aryl, aralkyl, or alkaryl. Suitable alkyl $R^b$ groups often have 1 to 10 carbon atoms, 1 to 6 carbon atoms, or 1 to 4 carbon atoms. Suitable aryl $R^b$ groups often have 6 to 12 carbon atoms such as, for example, phenyl. Suitable aralkyl and alkaryl $R^b$ groups often have an alkyl group with 1 to 10 carbon atoms, 1 to 6 carbon atoms, or 1 to 4 carbon atoms and an aryl having 6 to 12 carbon atoms.

The term "halo" refers to a halogen atom such as fluoro, bromo, iodo, or chloro. When part of a reactive silyl, the halo group is often chloro.

The term "reactive group" refers to a functionality that will react with itself and/or another molecule (e.g., through polymerizing or crosslinking) to form a polymeric network. Such group can also be referred to as a "polymerizable group." The polymerizable group often includes a group that can undergo a free radical reaction such as an ethylenically unsaturated group. Alternatively, the polymerizable group can undergo a hydrolysis and/or condensation reaction. Such polymerizable groups include hydrolyzable silyl groups. Additionally, the term "reactive group" refers to a first group that can react with a second group on a substrate surface to attach the first group to substrate though the formation of a covalent bond. Such group can also be referred to as a "substrate-reactive group." The substrate-reactive group typically includes a hydrolyzable silyl group.

The term "(meth)acryloyloxy group" includes an acryloyloxy group (—O—(CO)—CH=CH$_2$) and a methacryloyloxy group (—O—(CO)—C(CH$_3$)=CH$_2$).

The term "(meth)acryloylamino group" includes an acryloylamino group (—NR—(CO)—CH=CH$_2$) and a methacryloylamino group (—NR—(CO)—C(CH$_3$)=CH$_2$) including embodiments wherein the amide nitrogen is bonded to a hydrogen, methyl group, or ethyl group (R is H, methyl, or ethyl).

The terms "comprises" and variations thereof do not have a limiting meaning where these terms appear in the description and claims.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise. The term "and/or" means one or all of the listed elements or a combination of any two or more of the listed elements.

Also herein, all numbers are assumed to be modified by the term "about" and preferably by the term "exactly." As used herein, in connection with a measured quantity, the term "about" refers to that variation in the measured quantity as would be expected by the skilled artisan making the measurement and exercising a level of care commensurate with the objective of the measurement and the precision of the measuring equipment used.

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

When a group is present more than once in a formula described herein, each group is "independently" selected, whether specifically stated or not. For example, when more than one R group is present in a formula, each R group is independently selected. Furthermore, subgroups contained within these groups are also independently selected. For example, when each R group contains a Y group, each Y is also independently selected.

As used herein, the term "room temperature" refers to a temperature of 20° C. to 25° C. or 22° C. to 25° C.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION OF EXEMPLARY EMBODIMENTS

The present disclosure provides reactive polyoxazolines (POx) having a perfluorinated alkyl group.

In recent years, the use of polyoxazolines (POx) in biomedical applications has gained interest due to their high biocompatibility and stealth behavior that resembles polyethylene glycol (PEG). POx's can be obtained through living cationic ring opening polymerization, which provides an easy access to a wide variety of well-defined polymers. Furthermore, the functionality and the resulting physical properties of POx's can be tuned simply by changing the initiator, monomer, and the end-group used in the polymerization. Poly(methyl-oxazoline)s and poly(ethyl-oxazoline)s have been shown to have faster in-vivo clearance and in the case of poly(methyl-oxazoline) more hydrophilic character than PEG, which brings a great advantage for antifouling applications. Polyoxazolines also have improved chemical stability, allowing for the production of more durable coatings than those including PEG.

The present disclosure provides reactive polyoxazolines (POx) having a perfluorinated alkyl group. The polyoxazolines are employed as the hydrophilic component, and a perfluorinated alkyl group is employed as the hydrophobic component. Such amphiphilic polymerizable polymers are suitable for making polymers that can be used in making antifouling coatings.

In one embodiment, the present disclosure provides a compound (i.e., polymerizable or substrate-reactive polyoxazoline) of the formula:

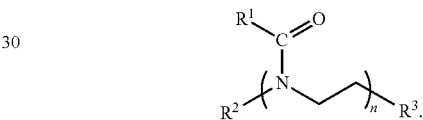

In certain embodiments, R$^1$ is selected from H, an alkyl group, an aryl group, and combinations thereof. In certain embodiments, R$^1$ is H, a (C1-C20)alkyl group, a (C6-C12)aryl group, a (C6-C12)ar(C1-C20)alkyl group, or a (C1-C20)alk(C6-C12)aryl group. In certain embodiments, R$^1$ is selected from H, methyl, and ethyl.

In certain embodiments, R$^2$ is R$^f$—Y—(CH$_2$)$_x$—.

In certain embodiments, R$^3$ is a reactive group (e.g., a polymerizable group and/or a substrate-reactive group).

In certain embodiments, R$^3$ is a polymerizable group, in particular an ethylenically unsaturated group selected from a vinyl group, a vinylether group, a (meth)acryloyloxy group, and a (meth)acryloylamino group (including embodiments wherein the nitrogen is optionally substituted with methyl or ethyl).

In certain embodiments, R$^3$ is a substrate-reactive group (e.g., an organic group containing a hydrolyzable silyl group) that provides functionality for bonding to a substrate surface.

In certain embodiments R$^3$ is of the formula —W—Si(R$^9$)$_3$ wherein W is an organic group and each R$^9$ group is independently selected from an alkyl group, an aryl group, or a combination thereof (an alkaryl group or an aralkyl group) and a hydrolyzable group; and at least one R$^9$ is a hydrolyzable group. In certain embodiments, the hydrolyzable group is selected from a halo, an alkoxy group, and an acyloxy group. In certain embodiments, the hydrolyzable group is selected from a halo, a (C1-C4)alkoxy group, and a (C1-C4)acyloxy group. In certain embodiments, all three R$^9$ groups are hydrolyzable groups. In certain embodiments, all three R$^9$ groups are the same.

In certain embodiments, W is selected from an alkylene group, an arylene group, and a combination thereof (i.e., an alkarylene group or an aralkylene group), optionally including —O—, —C(O)—, —NR—, —S—, or a combination thereof, wherein R is H, methyl, or ethyl. Such optional group is typically not directly bonded to the silyl group. In certain embodiments, W is selected from a (C1-C20)alkylene group, a (C6-C12)arylene group, and combination thereof, optionally including —O—, —C(O)—, —NR—, —S—, or a combination thereof. For example, W can be of the divalent group of formula —N(R)—R$^7$— or —S—R$^8$— where R$^7$ and R$^8$ are each an alkylene group and R is H, methyl, or ethyl.

Examples substrate-reactive groups include trialkoxysilylalkylamino (including embodiments wherein the nitrogen is optionally substituted with methyl or ethyl) and trialkoxysilylalkylthio. Such groups are not only substrate-reactive but may also be polymerizable and form a network.

In certain embodiments, R$^3$ is selected from a (meth)acryloyloxy group, a (meth)acryloylamino group, a trialkoxysilylalkylthio group, and a trialkyoxysilylalkylamino group.

In certain embodiments, R$^3$ is selected from a (meth)acryloyloxy group, and a (meth)acryloylamino group.

In certain embodiments, the trialkoxysilylalkylamino group is of the formula —N(R)—R$^7$—Si(OR$^4$)(OR$^5$)(OR$^6$), wherein R is H, methyl, or ethyl, and each R$^4$, R$^5$, and R$^6$ is an alkyl group, and R$^7$ is an alkylene group. In certain embodiments, the trialkoxysilylalkylamino group is of the formula —N(R)—CH$_2$CH$_2$CH$_2$—Si(OR$^4$)(OR$^5$)(OR$^6$), wherein R is H, methyl, or ethyl, and each R$^4$, R$^5$, and R$^6$ is an alkyl group, preferably methyl or ethyl.

In certain embodiments, the trialkoxysilylalkylthio group is of the formula —S—R—Si(OR$^4$)(OR$^5$)(OR$^6$), wherein each R$^4$, R$^5$, and R$^6$ is an alkyl group, and R$^8$ is an alkylene group. In certain embodiments, the trialkoxysilylalkylthio is of the formula —S—CH$_2$CH$_2$CH$_2$—Si(OR$^4$)(OR)(OR$^6$), wherein R is H, methyl, or ethyl, and each R$^4$, R$^5$, and R$^6$ is an alkyl group, preferably methyl or ethyl.

In certain embodiments, R$^2$ is R$^f$—Y—(CH$_2$)$_x$—. Y is selected from a bond, —S(O)$_2$—N(CH$_3$)—, —S(O)$_2$—N(CH$_2$CH$_3$)—, —S(O)$_2$—O—, —S(O)$_2$—, —C(O)—, —C(O)—S—, —C(O)—O—, —C(O)—NH—, —C(O)—N(CH$_3$)—, —C(O)—N(CH$_2$CH$_3$)—, —(CH$_2$CH$_2$O)$_y$—, —O—, and —O—C(O)—CH=CH—C(O)—O—. In certain embodiments, Y is selected from a bond, —S(O)$_2$—N(CH$_3$)—, —C(O)—NH—, and —(CH$_2$CH$_2$O)$_y$—.

In certain embodiments, R$^f$ is a perfluorinated alkyl group. In certain embodiments, R$^f$ is a perfluorinated (C1-C5)alkyl group. In certain embodiments, R$^f$ is a perfluorinated C4 alkyl group.

In certain embodiments, n is an integer of greater than 10. In certain embodiments, n is no greater than 500. In certain embodiments, n is 20 to 100.

In certain embodiments, x is an integer from 2 to 20. In certain embodiments, x is 2 to 10. In certain embodiments, x is 2 to 6.

In certain embodiments, y is an integer equal to at least 1. In certain embodiments, y is no greater than 20. In certain embodiments, y is 1 to 5.

In one embodiment, the present disclosure provides a compound (i.e., a polymerizable or substrate-reactive polyoxazoline) of the formula:

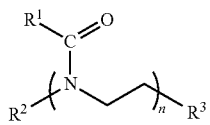

wherein: R$^1$ is selected from H, an alkyl group, an aryl group, and combinations thereof; R$^2$ is R$^f$—Y—(CH$_2$)$_x$—; R$^3$ is a reactive group; R$^f$ is a perfluorinated alkyl group; Y is selected from a bond, —S(O)$_2$—N(CH$_3$)—, —S(O)$_2$—N(CH$_2$CH$_3$)—, —S(O)$_2$—O—, —S(O)$_2$—, —C(O)—, —C(O)—S—, —C(O)—O—, —C(O)—NH—, —C(O)—N(CH$_3$)—, —C(O)—N(CH$_2$CH$_3$)—, —(CH$_2$CH$_2$O)$_y$—, —O—, and —O—C(O)—CH=CH—C(O)—O—; n is greater than 10; x is 2 to 20; and y is at least 1.

In one embodiment, the present disclosure provides a compound of the formula:

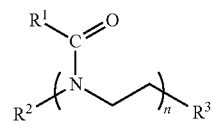

wherein: R$^1$ is selected from H, an alkyl group, an aryl group, and combinations thereof; R$^2$ is R$^f$—Y—(CH$_2$)$_x$—; R$^3$ is a reactive group selected from a polymerizable group and a group of formula —W—Si(R$^9$)$_3$; R$^f$ is a perfluorinated alkyl group; Y is selected from a bond, —S(O)$_2$—N(CH$_3$)—, —S(O)$_2$—N(CH$_2$CH$_3$)—, —S(O)$_2$—O—, —S(O)$_2$—, —C(O)—, —C(O)—S—, —C(O)—O—, —C(O)—NH—, —C(O)—N(CH$_3$)—, —C(O)—N(CH$_2$CH$_3$)—, —(CH$_2$CH$_2$O)$_y$—, —O—, and —O—C(O)—CH=CH—C(O)—O—; n is an integer of greater than 10; x is an integer from 2 to 20; y is an integer of at least 1; W is an organic group; and each R$^9$ is independently an alkyl group, aryl group, or a combination thereof, or a hydrolyzable group, wherein at least one R$^9$ is a hydrolyzable group.

In one embodiment, the present disclosure provides a compound (i.e., a polymerizable or substrate-reactive polyoxazoline) of the formula:

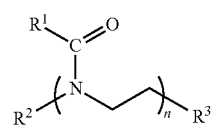

wherein: R$^1$ is selected from H, an alkyl group, an aryl group, and combinations thereof; R$^2$ is R$^f$—Y—(CH$_2$)$_x$—; R$^3$ is a reactive group selected from a vinyl group, a vinylether group, a (meth)acryloyloxy group (i.e., an acryloyloxy or methacryloyloxy), a (meth)acryloylamino group (i.e., an acryloylamino or methacryloylamino), a trialkoxysilylalkylthio group, and a trialkoxysilylalkylamino group; R$^f$ is a perfluorinated (C1-C5)alkyl group; Y is selected from a bond, —S(O)$_2$—N(CH$_3$)—, —C(O)—NH—, and —(CH$_2$CH$_2$O)$_y$—; n is 20 to 100; x is 2 to 20; and y is 1 to 20.

Such compounds are reactive polyoxazolines that can be made using conventional techniques. An exemplary reaction scheme is shown in the Examples Section (Scheme I). Typically, an oxazoline, particularly a 2-oxazoline that includes an R$^1$ group at the 2-position, is subjected to a ring opening reaction in a suitable solvent (e.g., acetonitrile) in the presence of an initiator (e.g., methyl trifluoromethansulfonate (i.e., methyl triflate), perfluorobutyl ethylene triflate, perfluorobutyl sulfonamide triflate, methyl toluene sulfonate (i.e., methyl tosylate), and methyl iodide) with heating (e.g., at a temperature of 80° C.), and subsequently modified to include a polymerizable group (e.g., upon reaction with (meth)acrylic acid) or a substrate reactive group (e.g., upon reaction with a compound of formula H—W—Si($R^9$)$_3$) in the presence of a base (e.g., triethylamine).

The resultant compounds of the present disclosure are useful in making polymers suitable for use in making anti-fog, anti-fouling, and/or easy clean coatings. They can be homopolymerized or copolymerized with other monomers to make suitable coatings. If desired, they can be combined with components, such as metal silicates (e.g., lithium silicate), to form hard coatings as is known in the art.

A coating composition can include a solvent. Useful solvents for the coating compositions include those in which the compound is soluble to at least 1% by weight. Typically, water is used, although other solvents such as methanol, ethanol, isopropanol, acetone, methyl ethyl ketone, methyl iso-butyl ketone, methyl acetate, ethyl acetate, heptane, toluene, xylene, and ethylene glycol alkyl ether can be used. Those solvents can be used alone or as mixtures thereof. The coating composition is typically a homogeneous mixture that has a viscosity appropriate to the application conditions and method. For example, a material to be brush or roller coated would likely be preferred to have a higher viscosity than a dip coating composition. The coating composition is typically relatively dilute, often containing at least 0.1 wt-%, or at least 1 wt-%, of the compound. Typically, a coating composition includes no greater than 50 wt-%, or no greater than 25 wt-%, of the compound.

A wide variety of coating methods can be used to apply a composition of the present disclosure, such as brushing, spraying, dipping, rolling, spreading, and the like. The obtained coating on the substrate may be cured at room temperature or at an elevated temperature (e.g., 40° C. to 300° C.). In some embodiments the curing may be effected by a catalyst (such as an organic or inorganic acid or base, chelate of titanium (e.g., titanium isopropoxide), and tin based compounds (e.g., dibutyldiacetoxytin), at room temperature or elevated temperatures.

The substrate on which the coating can be disposed can be any of a wide variety of materials. Useful substrates include ceramics, siliceous substrates including glass, metal, natural and man-made stone, and polymeric materials, including thermoplastics and thermosets. Suitable materials include, for example, poly(meth)acrylates, polycarbonates, polystyrenes, styrene copolymers such as styrene acrylonitrile copolymers, polyesters, polyethylene terephthalate, silicones such as that used in medical tubing, paints such as those based on acrylic resins, powder coatings such as polyurethane or hybrid powder coatings, and wood. The substrates can be in the form of wovens, nonwovens, or films, for example.

In some embodiments, the substrate is selected to have a group that can react with the polyoxazoline. For example, the substrate can have a glass or ceramic-containing surface that has silanol groups that can undergo a condensation reaction with group $R^3$ selected from a trialkoxysilylalkylthio or a trialkoxysilylamino group. The product of this reaction results in the formation of a —Si—O—Si— bond between the polyoxazoline and the substrate.

The following is a list of illustrative embodiments of the present disclosure.

Embodiment 1 is a compound of the formula:

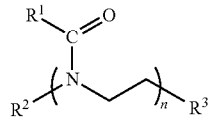

wherein:
$R^1$ is selected from H, an alkyl group, an aryl group, and combinations thereof;
$R^2$ is $R^f$—Y—(CH$_2$)$_x$—;
$R^3$ is a reactive group;
$R^f$ is a perfluorinated alkyl group;
Y is selected from a bond, —S(O)$_2$—N(CH$_3$)—, —S(O)$_2$—N(CH$_2$CH$_3$)—, —S(O)$_2$—O—, —S(O)$_2$—, —C(O)—, —C(O)—S—, —C(O)—O—, —C(O)—NH—, —C(O)—N(CH$_3$)—, —C(O)—N(CH$_2$CH$_3$)—, —(CH$_2$CH$_2$O)$_y$—, —O—, and —O—C(O)—CH═CH—C(O)—O—;
n is an integer of greater than 10;
x is an integer from 2 to 20; and
y is an integer of at least 1.

Embodiment 2 is the compound of embodiment 1 wherein $R^1$ is H, a (C1-C20)alkyl group, a (C6-C12)aryl group, a (C6-C12)ar(C1-C20)alkyl group, or a (C1-C20)alk(C6-C12)aryl group.

Embodiment 3 is the compound of embodiment 1 wherein $R^1$ is selected from H, methyl, and ethyl.

Embodiment 4 is the compound of any one of embodiments 1 through 3 wherein the reactive $R^3$ group is a polymerizable group or a substrate-reactive group.

Embodiment 5 is the compound of embodiment 4 wherein $R^3$ is of the formula —W—Si($R^9$)$_3$
wherein:
W is an organic group;
each $R^9$ group is independently selected from an alkyl group, an aryl group, a combination thereof, and a hydrolyzable group; and
at least one $R^9$ is a hydrolyzable group.

Embodiment 6 is the compound of embodiment 4 wherein $R^3$ comprises an ethylenically unsaturated group.

Embodiment 7 is the compound of embodiment 4 wherein $R^3$ is selected from a vinyl group, a vinylether group, a (meth)acryloyloxy group, a (meth)acryloylamino group, a trialkoxysilylalkylthio group, and a trialkoxysilylalkylamino group.

Embodiment 8 is the compound of embodiment 7 wherein $R^3$ is selected from a (meth)acryloyloxy group, a (meth)acryloylamino group, a trialkoxysilylalkylthio group, and a trialkoxysilylalkylamino group.

Embodiment 9 is the compound of embodiment 8 wherein $R^3$ is selected from a (meth)acryloyloxy group and a (meth)acryloylamino group.

Embodiment 10 is the compound of any one of embodiments 7 through 9 wherein the amide nitrogen of the (meth)acryloylamino group is optionally substituted with a methyl or ethyl group.

Embodiment 11 is the compound of any one of embodiments 7 through 9 wherein the trialkoxysilylalkylamino group is of the formula —N(R)—$R^7$—Si(O$R^4$)(O$R^5$)(O$R^6$), wherein R is H, methyl, or ethyl, and each $R^4$, $R^5$, and $R^6$ is an alkyl group, and $R^7$ is an alkylene group.

Embodiment 12 is the compound of any one of embodiments 7 through 9 wherein the trialkoxysilylalkylthio group is of the formula —S—$R^8$—Si(O$R^4$)(O$R^5$)(O$R^6$), wherein each $R^4$, $R^5$, and $R^6$ is an alkyl group, and $R^8$ is an alkylene group.

Embodiment 13 is the compound of any one of embodiments 1 through 12 wherein Y is selected from a bond, —S(O)$_2$—N(CH$_3$)—, —C(O)—NH—, and —(CH$_2$CH$_2$O)$_y$—.

Embodiment 14 is the compound of any one of embodiments 1 through 13 wherein $R^f$ is a perfluorinated (C1-C5) alkyl group.

Embodiment 15 is the compound of embodiment 14 wherein $R^f$ is a perfluorinated C4 alkyl group.

Embodiment 16 is the compound of any one of embodiments 1 through 15 wherein n is an integer no greater than 500.

Embodiment 17 is the compound of embodiment 16 wherein n is an integer from 20 to 100.

Embodiment 18 is the compound of any one of embodiments 1 through 17 wherein x is from 2 to 10.

Embodiment 19 is the compound of embodiment 16 wherein x is an integer from 2 to 6.

Embodiment 20 is the compound of any one of embodiments 1 through 19 wherein y is an integer no greater than 20.

Embodiment 21 is the compound of embodiment 18 wherein y is an integer from 1 to 5.

Embodiment 22 is a compound of the formula:

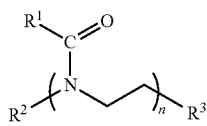

wherein:

$R^1$ is selected from H, an alkyl group, an aryl group, and combinations thereof;

$R^2$ is $R^f$—Y—$(CH_2)_x$—;

$R^3$ is selected from a vinyl group, a vinylether group, a (meth)acryloyloxy group, and a (meth)acryloylamino group, a trialkoxysilylalkylthio group, and a trialkoxysilylalkylamino group;

$R^f$ is a perfluorinated (C1-C5)alkyl group;

Y is selected from a bond, —S(O)$_2$—N(CH$_3$)—, —C(O)—NH—, and —(CH$_2$CH$_2$O)$_y$—;

n is an integer from 20 to 100;

x is an integer from 2 to 20; and y is an integer from 1 to 20.

Embodiment 23 is the compound of embodiment 22 wherein $R^3$ is a polymerizable group selected from a (meth)acryloyloxy and a (meth)acryloylamino.

EXAMPLES

Objects and advantages of this disclosure are further illustrated by the following examples, but the particular materials and amounts thereof recited in these examples, as well as other conditions and details, should not be construed to unduly limit this disclosure.

General Procedures for Polymer Synthesis:

Glassware was dried overnight in an oven at 150° C. prior to use. Reagents were purchased from Fisher Scientific or Sigma Aldrich. Acetonitrile was anhydrous grade. Methyl iodide, methyl tosylate, and oxazoline monomers were distilled over CaH$_2$ and stored over 3 Å molecular sieves. Other reagents for oxazoline polymerization were stored over 3 Å molecular sieves prior to use. Solvents were removed at reduced pressure using a rotary evaporator.

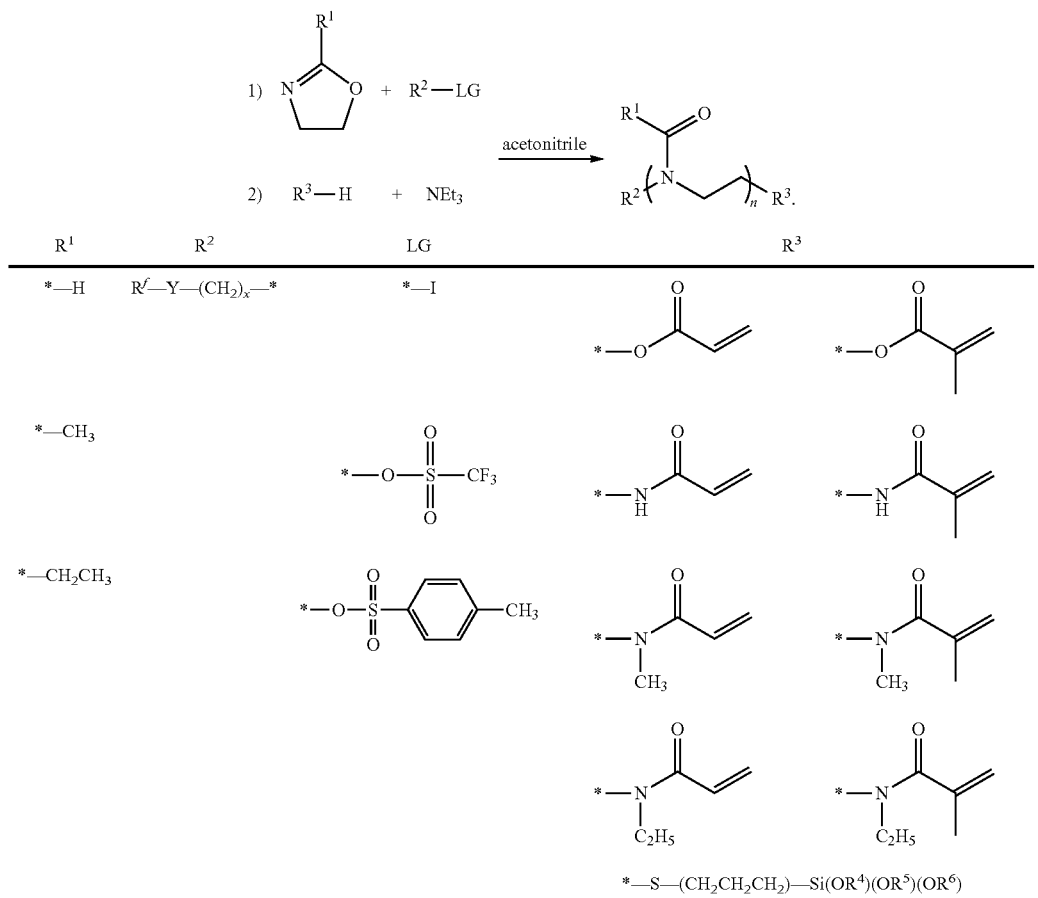

Scheme I: General scheme for the synthesis of poly(oxazoline) polymers (wherein "LG" = leaving group, and the * represents the point of attachment of the group)

Scheme I: General scheme for the synthesis of poly(oxazoline) polymers (wherein "LG" = leaving group, and the * represents the point of attachment of the group)

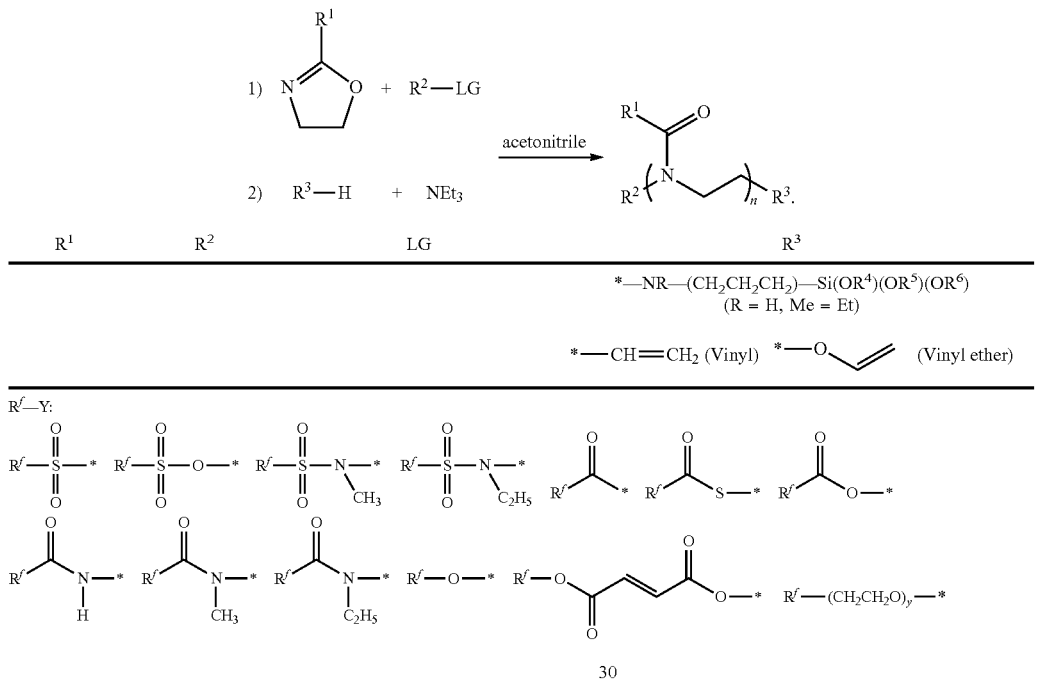

Preparatory Example 1: Synthesis of $R^2$-LG

A round bottom flask, equipped with a stopcock, was purged with nitrogen, then charged with anhydrous dichloromethane (20 milliliters (mL)), 1,4-dioxane (20 mL), pyridine (2.0 grams (g), 24.6 millimoles (mmol)) and 1H, 1H, 2H, 2H-perfluorohexanol (5.0 g, 18.9 mmol). The solution was cooled to 0° C., then trifluoromethanesulfonic anhydride (7.0 g, 24.6 mmol) was added drop-wise by syringe to the vigorously stirring solution. After stirring for 2 hours at 0° C., the solution was slowly warmed to room temperature and then stirred for additional 10 hours. The resulting suspension was filtered to remove the precipitated salts. The solution was then washed successively with 1 Normal (N) HCl, saturated $NaHCO_3$, 10% copper sulfide solution, and brine. The organic phase was dried over anhydrous $Na_2SO_4$ and excess solvent was removed under vacuum. The resulting brown oil was distilled under reduced pressure to yield 3.0 g of the product as colorless liquid.

Preparatory Example 2: Synthesis of $R^2$-LG

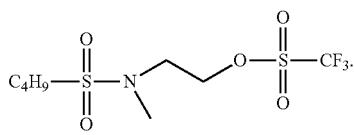

A round bottom flask, equipped with a stopcock, was purged with nitrogen, then charged with anhydrous dichloromethane (50 mL), 1,4-dioxane (50 mL), pyridine (3.6 g, 45.4 mmol) and N-methyl-1,1,2,2,3,3,4,4-nonafluoro-N-(2-hydroxyethyl)butane-1-sulphonamide (12.5 g, 34.9 mmol). The solution was cooled to 0° C., then trifluoromethanesulfonic anhydride (12.8 g, 45.4 mmol) was added drop-wise by syringe to the vigorously stirring solution. After stirring for 2 hours at 0° C., the solution was slowly warmed to room temperature and then stirred for additional 10 hours. The resulting suspension was filtered to remove the precipitated salts. The solution was then washed successively with 1N HCl, saturated $NaHCO_3$, 10% copper sulfide solution, and brine. The organic phase was dried over anhydrous $Na_2SO_4$ and excess solvent was removed under vacuum. Recrystallization of the resulting solid from cold toluene yielded 7.5 g of the product as white solid.

Example 1: Synthesis of Polymerizable Polyoxazoline

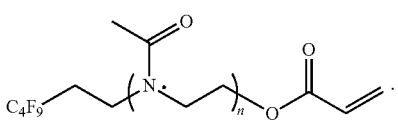

A 3-necked flask with attached condenser and stopcock was purged with nitrogen, then charged with acetonitrile (20 mL) and perfluorobutyl ethylene triflate ($R^2$-LG) initiator of Preparatory Example 1 (0.4 g, 1.0 mmol). The solution was cooled to 0° C., then 2-methyl-2-oxazoline (2.6 g, 30 mmol) was added by syringe. After stirring for 2 hours while slowly warming to room temperature, the solution was heated to 80° C. in an oil bath, then stirred for 20 hours. After cooling to room temperature, acrylic acid (0.36 g, 5.0 mmol) and triethylamine (0.61 g, 6.0 mmol) were added by syringe in that order. The solution was heated back up to 80° C., and stirred for another 24 hours. After cooling, the solution was filtered, then added dropwise with vigorous stirring to 200 mL of diethyl ether to precipitate the polymer. The resulting suspension was stirred for 15 minutes (min). The precipitate was isolated by filtration, washed with diethyl ether, and dried under vacuum at 80° C. overnight, yielding 2.6 g of white solid. End-group analysis by ¹H-NMR spectroscopy showed that polymer with n=30 was obtained.

Example 2: Synthesis of Polymerizable Polyoxazoline

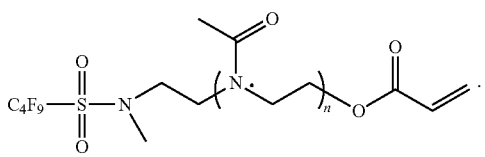

A 3-necked flask with attached condenser and stopcock was purged with nitrogen, then charged with acetonitrile (15 mL) and perfluorobutyl sulfonamide triflate ($R^2$-LG) initiator of Preparatory Example 2 (0.74 g, 1.5 mmol). The solution was cooled to 0° C., then 2-methyl-2-oxazoline (3.9 g, 46 mmol) was added by syringe. After stirring for 15 minutes, the solution was warmed to 80° C., then stirred for 16 hours. After cooling to room temperature, acrylic acid (0.16 g, 2.3 mmol) and triethylamine (0.31 g, 3.0 mmol) were added by syringe in that order. The solution was heated back up to 80° C., and stirred for another 4 hours. After cooling, the acetonitrile was evaporated with a stream of nitrogen, and the remainder was dissolved in 50 mL of chloroform. This solution was filtered, then concentrated to about 20 mL. The solution was then added dropwise, with vigorous stirring, to 200 mL of diethyl ether to precipitate the polymer. The resulting suspension was left in the freezer overnight. The precipitate was isolated by filtration, washed with diethyl ether, and dried under vacuum at 80° C. overnight, yielding 4.7 g of white solid. Accounting for the presence of triethylammonium triflate impurities, the yield was 96%. End-group analysis by ¹H-NMR spectroscopy showed that polymer with n=30 was obtained.

Example 3: Synthesis of Alkoxysilane-Functional Polymer

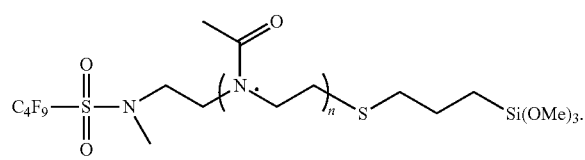

A 3-necked flask with attached condenser and stopcock was purged with nitrogen, then charged with acetonitrile (5 mL) and perfluorobutyl sulfonamide triflate initiator ($R^2$-LG) initiator of Preparatory Example 2 (0.63 g, 1.3 mmol). The solution was heated to 40° C., then 2-methyl-2-oxazoline (3.3 g, 39 mmol) was added by syringe. After stirring for 15 minutes, the solution was warmed to 80° C., then stirred for 17 hours. After cooling to 0° C., (3-mercaptopropyl)trimethoxysilane (0.30 g, 1.6 mmol) and triethylamine (0.26 g, 2.6 mmol) were added by syringe in that order. The solution was heated back up to 80° C., and stirred for another 2 hours. After cooling, the acetonitrile was evaporated with a stream of nitrogen, and the remainder was dissolved in 50 mL of chloroform with 2.5% methanol. This solution was filtered, then concentrated to about 20 mL. The solution was then added dropwise with vigorous stirring to 200 mL of diethyl ether containing 2.5% methanol. The resulting suspension was left in the freezer overnight. The precipitate was isolated by filtration, washed with diethyl ether, and dried under vacuum at 80° C. overnight, yielding 4.0 g of white solid. Accounting for the presence of triethylammonium triflate impurities, the yield was close to quantitative. End-group analysis by ¹H-NMR spectroscopy showed that polymer with n=30 was obtained.

Example 4: Preparation and Characterization of Coatings

The polymer of Example 3 was dissolved in water at a concentration of 10% by weight. This solution was mixed in varying ratios with an aqueous solution of lithium silicate (Nissan Chemical Industries) diluted to a concentration of 10% by weight. These solutions were then coated on 2 mil polyethylene terephthalate (PET) film with a number 12 wire-wound rod (BYK instruments). The films were dried and cured in an oven at 80° C. for 1 hour.

Coatings were characterized by dynamic contact angle and by measuring transmission and haze. Dynamic contact angle measurements were observed using a DSA 100 video contact angle goniometer (Kruss Inc.) equipped with a Hamilton syringe having a flat-tipped needle. Deionized water and n-hexadecane were used as the probe fluids. Advancing contact angle and receding contact angle were measured as water was supplied via the syringe into or out of sessile droplets (drop volume approximately 5 microliters (μL)). All reported values are averages of six contact angle measurements of drops on three different areas of each sample (left and right angles measured for each drop). Reported errors are one standard deviation. Percent (%) Transmission and % Haze were measured for coated films using a Haze-gard plus (BYK Instruments Inc.). Measurements were collected on three different areas of each sample and reported errors are one standard deviation. The results are summarized in Table 1 below.

TABLE 1

| | Optical and Surface Properties of Coated PET Film | | | | | |
|---|---|---|---|---|---|---|
| Ratio of | Optical Properties | | Contact Angles | | | |
| Polymer to Lithium Silicate | % Transmission | % Haze | Water Advancing | Water Receding | Hexadecane Advancing | Hexadecane Receding |
| 1:4 | 84.7 ± 1.3 | 32.4 ± 1.2 | wets | wets | wets | Wets |
| 1:2 | 91.9 ± 0.1 | 12.80 ± 0.78 | 23.0 ± 1.8 | 12.6 ± 0.8 | wets | Wets |
| 1:1 | 91.6 ± 0.2 | 1.73 ± 0.14 | 27.5 ± 1.1 | 13.2 | 46.7 ± 0.6 | 27.2 ± 0.5 |

TABLE 1-continued

Optical and Surface Properties of Coated PET Film

| Ratio of Polymer to Lithium Silicate | Optical Properties | | Contact Angles | | | |
|---|---|---|---|---|---|---|
| | % Transmission | % Haze | Water Advancing | Water Receding | Hexadecane Advancing | Hexadecane Receding |
| 2:1 | 91.4 ± 0.3 | 2.25 ± 0.87 | 34.3 ± 4.4 | 20.6 ± 0.9 | 46.8 ± 0.7 | 20.2 ± 0.8 |
| 4:1 | 91.2 ± 0.1 | 1.80 ± 0.01 | 46.6 ± 0.7 | 14.2 ± 0.7 | 45.8 ± 0.9 | 32.2 ± 0.4 |

Example 5: Anti-Fog Properties

The anti-fog properties of the coatings prepared in Example 4 were assessed via the following test. In a 1000 mL covered beaker, 400 mL of water was heated to 80° C. The lid contained a circular cut opening of 4 cm diameter, which was covered with a metal plate. The plate was removed, and the film sample was immediately placed over the opening with the coated side down. The degree of fogging observed on the film was recorded initially (within moments of applying the film), after 30 seconds (sec), and after 60 sec. The degree of fogging was graded by assigning one of the following ratings: P=pass (the film remains completely transparent), SF=slight fail (water droplights reduce visibility through the film slightly), F=fail (significant loss of visibility through the film), or BF=big fail (the film is rendered opaque with fog). The results are shown in Table 2.

TABLE 2

Fogging Properties of Coated PET Films

| Ratio of Polymer to Lithium Silicate in Coating | Initial Fogging | Fogging After 30 Sec | Fogging After 60 Sec |
|---|---|---|---|
| 1:4 | F | P | P |
| 1:2 | SF | P | P |
| 1:1 | F | SF | SF |
| 2:1 | SF | P | P |
| 4:1 | P | P | P |
| No Coating | BF | BF | BF |

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. A compound of the formula:

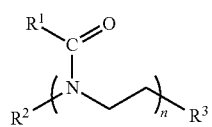

wherein:
R$^1$ is selected from H, an alkyl group, an aryl group, and combinations thereof;

R$^2$ is R$^f$—Y—(CH$_2$)$_x$—;
R$^3$ is a reactive group selected from (i) a polymerizable group, (ii) an organic group containing a hydrolyzable group, or (iii) a polymerizable group and an organic group containing a hydrolyzable group;
R$^f$ is a perfluorinated alkyl group comprising 1 to 5 carbon atoms;
Y is selected from —S(O)$_2$—N(CH$_3$)—, —S(O)$_2$—N(CH$_2$CH$_3$)—, —C(O)—NH—, —C(O)—N(CH$_3$)—, and —C(O)—N(CH$_2$CH$_3$)—;
n is an integer from 20 to 100;
x is an integer from 2 to 20; and
y is an integer of at least 1.

2. The compound of claim 1 wherein R$^1$ is selected from H, methyl, and ethyl.

3. The compound of claim 1 wherein R$^3$ is selected from a vinyl group, a vinylether group, a (meth)acryloyloxy group, a (meth)acryloylamino group, a trialkoxysilylalkylthio group, and a trialkoxysilylalkylamino group.

4. The compound of claim 1 wherein Y is selected from —S(O)$_2$—N(CH$_3$)—, and —C(O)—NH—.

5. The compound of claim 1 wherein n is an integer no greater than 500.

6. The compound of claim 1 wherein x is an integer from 2 to 10.

7. The compound of claim 1 wherein y is an integer no greater than 20.

8. The compound of claim 3, wherein R$^3$ is of the formula —W—Si(R$^9$)$_3$ wherein:
W is an organic group;
each R$^9$ group is independently selected from an alkyl group, an aryl group, a combination thereof, and a hydrolyzable group; and
at least one R$^9$ is a hydrolyzable group.

9. The compound of claim 3, wherein R$^3$ comprises an ethylenically unsaturated group.

10. The compound of claim 3, wherein R$^3$ is selected from a vinyl group, a vinylether group, a (meth)acryloyloxy group, a (meth)acryloylamino group, a trialkoxysilylalkylthio group, and a trialkoxysilylalkylamino group.

11. The compound of claim 10, wherein the trialkoxysilylalkylamino group is of the formula —N(R)—R$^7$—Si(OR$^4$)(OR$^5$)(OR$^6$), wherein R is H, methyl, or ethyl, and each R$^4$, R$^5$, and R$^6$ is an alkyl group, and R$^7$ is an alkylene group.

12. The compound of claim 10, wherein the trialkoxysilylalkylthio group is of the formula —S—R$^8$—Si(OR$^4$)(OR$^5$)(OR$^6$), wherein each R$^4$, R$^5$, and R$^6$ is an alkyl group, and R$^8$ is an alkylene group.

13. The compound of claim 11, wherein R$^3$ is a polymerizable group selected from a (meth)acryloyloxy and a (meth)acryloylamino.

14. The compound of claim 3, wherein Y is selected from —S(O)$_2$—N(CH$_3$)—, and —C(O)—NH—.

* * * * *

UNITED STATES PATENT AND TRADEMARK OFFICE
CERTIFICATE OF CORRECTION

PATENT NO.       : 9,718,920 B2
APPLICATION NO.  : 14/648733
DATED            : August 1, 2017
INVENTOR(S)      : Semra Colak Atan et al.

It is certified that error appears in the above-identified patent and that said Letters Patent is hereby corrected as shown below:

In the Specification

Column 3,
Line 60, after "is" delete "a".

Column 7,
Line 32, delete "—R—" and insert -- —$R^8$— --, therefor.
Line 34, delete "(OR)" and insert -- ($OR^5$) --, therefor.

Column 13 & 14,
Line 8, delete "Me = Et)" and insert -- Me, Et) --, therefor.

Lines 33-37, delete " 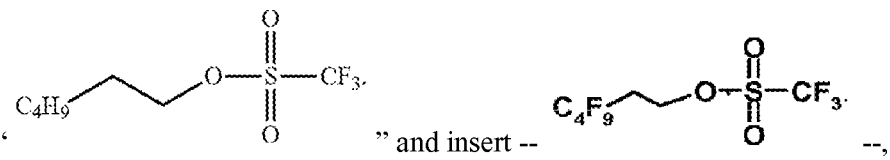 " and insert -- --, therefor.

Column 13,

Lines 59-64, delete " 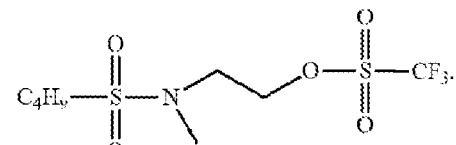 " and insert -- 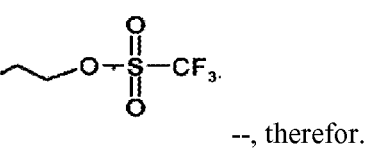 --, therefor.

Signed and Sealed this
Third Day of October, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,718,920 B2

In the Claims

<u>Column 18,</u>
Line 39, in Claim 8, delete "claim 3," and insert -- claim 1, --, therefor.
Line 46, in Claim 9, delete "claim 3," and insert -- claim 1, --, therefor.
Line 48, in Claim 10, delete "claim 3," and insert -- claim 1, --, therefor.
Line 62, in Claim 13, delete "claim 11," and insert -- claim 1, --, therefor.